(12) United States Patent
Manco et al.

(10) Patent No.: US 10,579,412 B2
(45) Date of Patent: Mar. 3, 2020

(54) METHOD FOR OPERATING VIRTUAL MACHINES ON A VIRTUALIZATION PLATFORM AND CORRESPONDING VIRTUALIZATION PLATFORM

(71) Applicant: NEC Laboratories Europe GmbH, Heidelberg (DE)

(72) Inventors: Filipe Manco, Lentisqueira (PT); Simon Kuenzer, Waghaeusel (DE); Florian Schmidt, Dossenheim (DE); Felipe Huici, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/307,944

(22) PCT Filed: Apr. 7, 2017

(86) PCT No.: PCT/EP2017/058445
§ 371 (c)(1),
(2) Date: Dec. 7, 2018

(87) PCT Pub. No.: WO2018/184701
PCT Pub. Date: Oct. 11, 2018

(65) Prior Publication Data
US 2019/0258503 A1 Aug. 22, 2019

(51) Int. Cl.
*G06F 9/455* (2018.01)
*G06F 9/4401* (2018.01)
*G06F 9/54* (2006.01)

(52) U.S. Cl.
CPC ........ *G06F 9/45558* (2013.01); *G06F 9/4401* (2013.01); *G06F 9/54* (2013.01);
(Continued)

(58) Field of Classification Search
CPC ................................................. G06F 9/45533
(Continued)

(56) References Cited

U.S. PATENT DOCUMENTS 8,387,046 B1 * 2/2013 Montague ............... G06F 21/53
713/164
9,135,043 B1 * 9/2015 Srinivasan .......... G06F 9/45558
(Continued)

OTHER PUBLICATIONS

Yun Chan Cho et al: "Sharing data between processes running on different domains in para-virtualized xen", Control, Automation and Systems, 2007. ICCAS '07. International Conference on, Anonymous, Seoul, Korea, Oct. 17, 2007 (Oct. 17, 2007), pp. 1255-1260, XP031223752.
(Continued)

*Primary Examiner* — Mehran Kamran
(74) *Attorney, Agent, or Firm* — Leydig, Voit & Mayer, Ltd.

(57) ABSTRACT

A method for operating virtual machines on a virtualization platform includes: embedding control information in a predetermined memory area of a front-end virtual machine where at least one virtual device is to be initialized, the control information being required for initiating a communication with a back-end virtual machine where at least one back-end driver runs; retrieving, by the front-end virtual machine, the control information from the predetermined memory area of the front-end virtual machine; and performing the communication between the front-end virtual machine and the back-end virtual machine via a direct communication channel to exchange information for initializing the at least one virtual device of the front-end virtual machine, by communicating with the at least one back-end driver via the direct communication channel. The direct communication channel is established based on the control information embedded in the predetermined memory area of the front-end virtual machine.

21 Claims, 7 Drawing Sheets

(52) U.S. Cl.
CPC .... *G06F 9/4411* (2013.01); *G06F 2009/4557* (2013.01); *G06F 2009/45562* (2013.01); *G06F 2009/45579* (2013.01)

(58) Field of Classification Search
USPC .......................................................... 718/1
See application file for complete search history.

(56) References Cited

U.S. PATENT DOCUMENTS

| | | | | |
|---|---|---|---|---|
| 9,507,617 | B1* | 11/2016 | Wang | G06F 9/4555 |
| 9,535,733 | B2* | 1/2017 | Rui | G06F 9/544 |
| 2009/0172660 | A1* | 7/2009 | Klotz, Jr. | G06F 9/5077 |
| | | | | 718/1 |
| 2011/0010428 | A1* | 1/2011 | Rui | G06F 9/544 |
| | | | | 709/213 |
| 2013/0014102 | A1* | 1/2013 | Shah | G06F 9/45558 |
| | | | | 718/1 |
| 2014/0181576 | A1* | 6/2014 | Chahal | G06F 9/45533 |
| | | | | 714/6.13 |
| 2014/0208318 | A1* | 7/2014 | Zhang | G06F 9/45529 |
| | | | | 718/1 |
| 2014/0282521 | A1* | 9/2014 | Lango | G06F 9/45558 |
| | | | | 718/1 |
| 2015/0058617 | A1* | 2/2015 | Oishi | G06F 9/5094 |
| | | | | 713/100 |
| 2015/0242221 | A1* | 8/2015 | Tsirkin | G06F 9/45558 |
| | | | | 718/1 |
| 2015/0370692 | A1* | 12/2015 | Tsirkin | G06F 11/3672 |
| | | | | 714/38.13 |
| 2017/0031593 | A1* | 2/2017 | Tsirkin | G06F 3/061 |
| 2017/0031628 | A1* | 2/2017 | Piel | G06F 3/0604 |
| 2017/0371733 | A1* | 12/2017 | Rugina | G06F 3/0659 |
| 2019/0199582 | A1* | 6/2019 | Liu | H04L 41/0631 |

OTHER PUBLICATIONS

Yuebin Bai et al: "A High Performance Inter.VM Network Communication Mechanism", May 21, 2010 (May 21, 2010), Algorithms and Architectures for Parallel Processing, Springer Berlin Heidelberg, Berlin, Heidelberg, pp. 363-380, XP019142366.

Filipe Manco et al: "My VM is Lighter (and Safer) than your Container", Proceedings of the 26th Symposium on Operating Systems Principles, SOSP '17, Oct. 28, 2017 (Oct. 28, 2017), pp. 218-233, XP055436727.

* cited by examiner

METHOD FOR OPERATING VIRTUAL MACHINES ON A VIRTUALIZATION PLATFORM AND CORRESPONDING VIRTUALIZATION PLATFORM

CROSS-REFERENCE TO PRIOR APPLICATIONS

This application is a U.S. National Stage Application under 35 U.S.C. § 371 of International Application No. PCT/EP2017/058445 filed on Apr. 7, 2017. The International Application was published in English on Oct. 11, 2018, as WO 2018/184701 A1 under PCT Article 21(2).

FIELD

The present invention relates to a method for operating virtual machines on a virtualization platform.

Furthermore, the present invention relates to a virtualization platform for operating virtual machines.

BACKGROUND

In recent years, lightweight virtualization technologies such as Docker (available at "www.docker.com") and LXC (available at "linuxcontainers.org") are gaining enormous traction not only in the research field, but also in terms of real-world deployment. Google, for instance, is reported to run all of its services in containers, available at "www.theregister.co.uk/2014/05/23/google_containerization_two billion", and Container as a Service (CaaS) products are available from a number of major players including Azure's Container Service (available at "azure.microsoft.com/en-us/services/container-service"), Amazon's EC2 Container Service and Lambda offerings (available at "aws.amazon.com/lambda"), and Google's Container Engine service (available at "cloud.google.com/container-engine").

Beyond these services, lightweight virtualization is crucial to a wide range of use cases, including just-in-time instantiation of services (e.g., described in the non-patent literature of MADHAVAPEDDY, A., LEONARD, T., SKJEGSTAD, M., GAZA-GNAIRE, T., SHEETS, D., SCOTT, D., MORTIER, R., CHAUDHRY, A., SINGH, B., LUDLAM, J., CROWCROFT, J., AND LESLIE, I. Jitsu: Just-in-time summoning of unikernels. In 12th USENIX Symposium on Networked Systems Design and Implementation (NSDI 15) (Oakland, Calif., 2015), USENIX Association, pp. 559-573)—e.g., filters against Distributed Denial of Service (DDoS) attacks, TCP acceleration proxies, content caches, etc.—and networks functions virtualization (NFV), all the while providing significant cost reduction through consolidation and power minimization.

The reasons for containers to have taken the virtualization market by storm are clear. In contrast to heavyweight, hypervisor-based technologies—which represent virtualization platforms—such as VMWare, KVM or Xen, containers provide extremely fast instantiation times, small per-instance memory footprints, and high density on a single host, among other features.

However, no technology is perfect, and containers are no exception. Security, for one, has been and continues to be a thorn on their side. First, their large trusted computing base (TCB), at least compared to type-1 hypervisors, has resulted in a large number exploits. Second, a container that causes a kernel panic will bring down the entire host. Further, any container that can monopolize or exhaust system resources (e.g., memory, file descriptors, user IDs, forkbombs, etc.) will cause a Denial-of-Service (DOS) attack on all other containers on that host. Over the years, a significant amount of effort has resulted in the introduction of mechanisms such as user namespaces and Seccomp that harden or eliminate a large number of these attack vectors. However, a simple misconfiguration can still lead to an insecure system.

Beyond security, another downside of containers is that their sharing of the same kernel rules out the possibility to specialize the kernel and its network stack to provide better functionality and performance to specific applications. Finally, containers do not currently support live migration, although support for it is under development.

At least for multitenant deployments, this leaves with a difficult choice between:

(1) containers and the security issues surrounding them, and (2) the burden coming from heavyweight, VM-based platforms.

Clearly, it cannot easily, overnight, be fixed all of the security issues related to containers, nor prevent new ones from arising.

Thus, the ability to quickly boot virtual machines (VMs), destroy them, migrate them, and concurrently run as many of them on a single server is important to a vast number of applications in the field of Network Function Virtualization (NFV). For example, to run as many vCPEs (virtual customer premises equipments) as possible on a single server, to instantiate firewalls on a per-connection basis, to dynamically create filters to deal with Denial-of-Service attacks, to be able to quickly and dynamically boot monitoring services to oversee financial transactions, and to host services whose key performance indicators (KPIs) depend on boot times such as block chain and function-based services such as Amazon's Lambda, among many others.

A significant part of the overhead when booting a virtual machine or migrating it comes from the scalability of the back-end information store, for example the XenStore in the Xen hypervisor, which is used to keep control information about the instances currently running in the system.

Hence, known virtualization platforms use a back-end information store to keep track of control information about the virtual machines currently running on the system such as a unique machine identifier, a name, the amount of memory allocated, etc., along with information about the virtual devices they are using, for example network device addresses and device capabilities. While certainly useful, the back-end information store is often a source of bottlenecks that only get worse as the number of virtual machines increases. The reason for this is that an operation like virtual machine creation requires multiple interactions with such a back-end information store.

The back-end information store is crucial to the way a virtualization platform such as Xen functions, with many xl commands making heavy use of it. As way of illustration FIG. 5a shows the process when creating a virtual machine and its (virtual) network device. First, the toolstack writes an entry to the network back-end's directory, essentially announcing the existence of a new virtual machine in need of a network device. Previous to that, the back-end placed a watch on that directory; the toolstack writing to this directory triggers the back-end to assign an event channel and other information (e.g., grant references, a mechanism for sharing memory between virtual machines and to write it back to the back-end information store such as the XenStore of Xen. Finally, when the virtual machine boots up, it contacts the back-end information store to retrieve the information previously written by the network back-end. As such, the above is a simplification: in actuality, the virtual machine creation process alone can require interaction with over 30 back-end information store entries, a problem that is exacerbated with increasing number of virtual machines and devices. Worse, the back-end information represents a single point of failure.

As previously mentioned, the importance of small creation and boot times is at least partly demonstrated by the rise of containers and their typically faster-than-VMs boot times, although containers trade-off this performance against isolation, which is basic to a number of the application scenarios mentioned above. Known virtualization platforms, and the virtual machines that run on top of them, appears to be inherently and fundamentally heavyweight and slow to boot.

SUMMARY

An embodiment of the present invention provides a method for operating virtual machines on a virtualization platform that includes: embedding control information in a predetermined memory area of a front-end virtual machine where at least one virtual device is to be initialized, the control information being required for initiating a communication with a back-end virtual machine where at least one back-end driver runs; retrieving, by the front-end virtual machine, the control information from the predetermined memory area of the front-end virtual machine; and performing the communication between the front-end virtual machine and the back-end virtual machine via a direct communication channel to exchange information for initializing the at least one virtual device of the front-end virtual machine, by communicating with the at least one back-end driver via the direct communication channel. The direct communication channel is established based on the control information embedded in the predetermined memory area of the front-end virtual machine.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
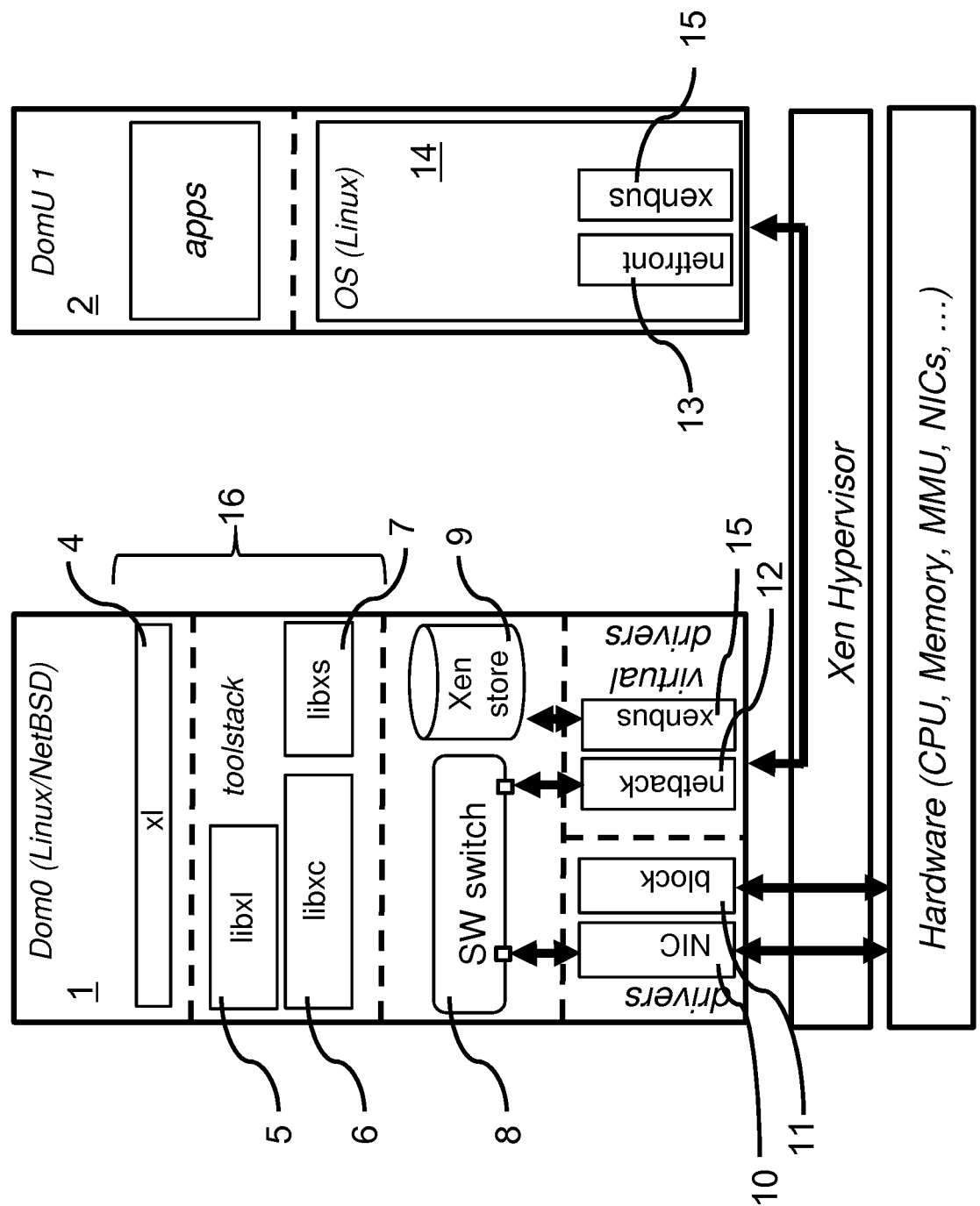
FIG. 1 is a schematic view illustrating an overview of the Xen architecture including toolstack, the XenStore, software switch and split virtual drivers between the driver domain dom0 and the guests.

The present invention provides a method for operating virtual machines on a virtualization platform in such a way that virtual machine creation, migration and/or destruction is improved, in particular with regard to virtual machine creation, migration and/or destruction times, preferably while retaining the isolation and security afforded by the underlying virtualization platform. Furthermore, a corresponding virtualization platform is provided.

In accordance with the invention, a method is provided for operating virtual machines on a virtualization platform, the method including:

embedding, preferably by a toolstack of the virtualization platform, control information in a predetermined memory area of a front-end virtual machine where at least one virtual device is to be initialized, wherein the control information is required for initiating a communication with a back-end virtual machine where at least one back-end driver runs;

retrieving, by the front-end virtual machine, the control information from the predetermined memory area of the front-end virtual machine; and performing the communication between the front-end virtual machine and the back-end virtual machine via a direct communication channel in order to exchange information for initializing the at least one virtual device of the front-end virtual machine, in particular by communicating with the at least one back-end driver via the direct communication channel, wherein the direct communication channel is established based on the control information embedded in the predetermined memory area of the front-end virtual machine.

Furthermore, a virtualization platform is provided for operating virtual machines, including a hypervisor that is configured to run one or more back-end virtual machines and one or more front-end virtual machines, wherein an entity, in particular a toolstack, of the virtualization platform is configured to embed control information in a predetermined memory area of a front-end virtual machine where at least one virtual device is to be initialized, wherein the control information is required for initiating a communication with a back-end virtual machine where at least one back-end driver runs, wherein the front-end virtual machine is configured to retrieve the control information from the predetermined memory area of the front-end virtual machine, and wherein the front-end virtual machine and the back-end virtual machine are configured to perform the communication between the front-end virtual machine and the back-end virtual machine via a direct communication channel in order to exchange information for initializing the at least one virtual device of the front-end virtual machine, in particular by communicating with the at least one back-end driver via the direct communication channel, wherein the direct communication channel is established based on the control information embedded in the predetermined memory area of the front-end virtual machine.

According to the invention, it has first been recognized that an enormous improvement with regard to virtual machine creation, migration and/or destruction times can be achieved by providing a virtualization platform that is able to function without a centralized back-end information store. Specifically, the single point of failure that a virtualization platform's back-end information store may represent is removed by embedding, preferably by a toolstack of the virtualization platform, control information in a predetermined memory area of a front-end virtual machine where at least one virtual device is to be initialized. The control information is required for initiating a communication with a back-end virtual machine where at least one back-end driver runs. According to the invention, the front-end virtual machine retrieves the control information from the predetermined memory area of the front-end virtual machine, preferably when the front-end virtual machine boots up. Thus, a method or virtualization platform according to the invention may achieve its improvement by having an entity, in particular a modified toolstack, that embeds control information directly inside of a front-end virtual machine's memory and by having the front-end virtual machine retrieve this control information from the predetermined memory area, e.g. from its local memory when the front-end virtual machine boots up. Furthermore, according to embodiments of the invention, the communication between the front-end virtual machine and the back-end virtual machine is performed via a direct communication channel in order to exchange information—in particular in a decentralized way—for initializing the at least one virtual device of the front-end virtual machine. For example, this may be achieved by communicating with the at least one back-end driver via the direct communication channel, wherein the direct communication channel is established based on the control information embedded in the predetermined memory area of the front-end virtual machine.

Hence, a method and a virtualization platform according to the present invention improve virtual machine creation, virtual machine migration and/or virtual machine destruction, in particular with regard to the virtual machine creation, virtual machine migration and/or virtual machine destruction times, while retaining the isolation and security afforded by the underlying virtualization platform.

Embodiments of the invention may extend to corresponding systems, methods, and computer program products such as computer readable storage media having instructions stored thereon which are operable to program a programmable computer processor to carry out a method as described in the aspects and embodiments that are set out below or recited in the claims and/or to program a suitably adapted computer to provide the virtualization platform recited in any of the claims.

The term "virtualization platform" may refer in particular in the claims, preferably in the description, to an entity including software packages that can emulate a whole physical computer machine. Specifically, the entity may provide multiple virtual machines on one physical platform. The virtualization platform can be implemented and provided by a software entity/product such as an emulator and/or hypervisor.

The term "toolstack" may refer in particular in the claims, preferably in the description, to at least one interface for hypervisor management and/or configuration of virtual machines. In particular, the toolstack may include a collection of tools and/or libraries, which provide interfaces between the hypervisor and the user/administrator of the system to interact and control the hypervisor. Thus, the toolstack may include a number of tools and libraries that are built on top of each other to provide certain functionalities. The toolstack being a collection of tools and libraries may be employed and/or may be configured to handle virtual machine management requests such as requesting, by the toolstack, a builder entity to create a new guest virtual machine in response to a user request.

The term "hypervisor" may refer in particular in the claims, preferably in the description, to computer software, firmware and/or hardware, which creates and runs virtual machines. A hypervisor may also be designated as a virtual machine monitor (VMM).

According to embodiments of the invention, the predetermined memory area for the front-end virtual machine may be created by a hypervisor of the virtualization platform. Thus, a virtualization platform can be provided, which employs decentralized interactions between virtual machines for initialization and deinitialization purposes for operations such as creating, destroying and/or migrating virtual machines. This significantly reduces the time it takes for such operations to complete, removes a single point of failure, and allows for highly-scalable performance by removing the bottleneck of centralized solutions having a centralized information store.

According to embodiments of the invention, the predetermined memory area dedicated to the control information may be created for each new front-end virtual machine that is created upon a virtual machine creation command. Thus, the provision of the predetermined memory area for each front-end virtual machine results in significant improvements for boot and migration times, among other metrics.

According to embodiments of the invention, the predetermined memory area may be set aside for the control information within the memory that is set aside for use by the front-end virtual machine, preferably when the front-end virtual machine is created.

According to embodiments of the invention, the predetermined memory area may be employed to keep track of the front-end virtual machine's control information about devices—preferably about any device—such as block devices and/or networking devices, which the front-end virtual machine may have. Thus, the control information of a virtual machine includes information about devices of the virtual machine.

According embodiments of the invention, the control information may include virtual machine identifiers, virtual device information, information about communication channels for devices, back-end identifiers, event channel identifiers and/or grant references. Further, the virtual device information may include a MAC (Media Access Control) address and/or an IP (Internet Protocol) address. Thus, a virtualization platform can be provided that employs decentralized interactions between virtual machines for initialization and deinitialization purposes for operations such as creating, destroying and/or migrating virtual machines. This significantly reduces the time it takes for such operations to complete, removes a single point of failure, and allows for highly-scalable performance by removing the bottleneck of centralized solutions having a centralized information store.

According to embodiments of the invention, it may be provided that the toolstack of the virtualization platform keeps track of which back-end devices are available and is responsible for assigning control information that is needed for a communication between the available back-end devices and the front-end virtual machine. The back-end device represents the physical device being controlled by a back-end driver of the back-end virtual machine. Thus, a virtualization platform can be provided which employs decentralized interactions between virtual machines for initialization and deinitialization purposes for operations such as creating, destroying and/or migrating virtual machines. This significantly reduces the time it takes for such operations to complete, removes a single point of failure, and allows for highly-scalable performance by removing the bottleneck of centralized solutions having a centralized information store.

The use of front-end driver and back-end driver represents an established concept in virtual machine drivers in which a physical device is controlled via a driver (the back-end, e.g. "netback" for network devices) that allows other entities (the front-end drivers, e.g. "netfront" for network devices) to also access the device. The front-end drivers create a virtual device inside virtual machines, which behaves like a physical device. The front-ends and back-ends communicate over a channel so that the virtual machines can use the virtual device to access the physical device's capabilities. For example, a network back-end driver (netback) controls a physical network adapter, and provides a communication interface for network front-end drivers (netfront), which provide virtual network interfaces in other virtual machines, so that they can access the network the physical machine is connected to.

According to embodiments of the invention, a hypercall may be employed by a virtual machine in order to write to and/or read from the predetermined memory area. A hypercall is a software trap from a virtual machine to the hypervisor, just as a syscall being a software trap from an application to the kernel. Virtual machines, i.e. domains, will use hypercalls to request privileged operations like, e.g., updating page tables. Like a syscall, the hypercall is synchronous, but the return path from the hypervisor to the virtual machine uses event channels. An event channel is a queue of asynchronous notifications, and notify of the same sorts of events that interrupts notify on native hardware. When a virtual machine with pending events in its queue is scheduled, the operating system's event-callback handler is called to take appropriate action. Thus, the hypercall is a request from a virtual machine to the hypervisor, for information, or for running a certain action on the virtual machine's behalf. Conceptually similar to a system call, in which an application asks the operating system to, e.g., write data to a hard disk: since the application must not access the hard disk itself for reasons of security and abstraction, it asks the operating system to do so on its behalf. Some operations, such as creating or destroying virtual machines, must not be done by a virtual machine itself; it needs to ask the hypervisor to do so on its behalf (and only virtual machine dom0 may typically ask for virtual machine creation, for example; such requests by other virtual machine, i.e. unprivileged domains, would be rejected.

According to embodiments of the invention, the predetermined memory area may be configured to be shared read-only with unprivileged front-end virtual machines. Thus, inadmissible write access and manipulations on the predetermined memory area by unprivileged virtual machines can be prevented.

According to embodiments of the invention, the predetermined memory area may be configured to be shared writable with a privileged virtual machine that includes the toolstack. Thus, the privileged virtual machine where the toolstack is located can control and embed the information stored in the predetermined data area. Hence, data security and data integrity is ensured at the predetermined data area.

According to embodiments of the invention, the predetermined memory area may be implemented as a memory page. Thus, a fast and efficient memory access is provided. Furthermore, by using memory pages the memory can be shared and protected from unprivileged accesses at page level.

According to embodiments of the invention, a front-end driver of the at least one virtual device may be configured to read the control information from the predetermined memory area and to initiate a communication with a back-end driver of the back-end virtual machine as provided by the control information. The control information can be employed to directly contact a back-end device of the back-end virtual machine via the direct communication channel. Thus, a virtualization platform can be provided which employs decentralized interactions between virtual machines for initialization and deinitialization purposes for operations such as creating, destroying and/or migrating virtual machines. This significantly reduces the time it takes for such operations to complete, removes a single point of failure, and allows for highly-scalable performance by removing the bottleneck of centralized solutions having a centralized information store.

According to embodiments of the invention, an operating system of the front-end virtual machine may be configured to retrieve the control information from the predetermined memory area when the front-end virtual machine boots up. Thus, a significant improvement is provided for boot and migration times, among other metrics.

According to embodiments of the invention, the embedding of the control information into the predetermined memory area, the retrieving of the control information from the predetermined memory area by the front-end virtual machine and the performing of the communication between the front-end virtual machine and the back-end virtual machine may be employed for creating, destroying and/or migrating the front-end virtual machine. Thus, the time it takes for these operations to complete can be significantly reduced. Further, a single point of failure is removed, and highly-scalable performance is provided by removing the bottleneck of centralized solutions having a centralized information store.

According to embodiments of the invention, the toolstack may embed the control information in the predetermined memory area by means of a notification mechanism. Thus, an efficient data exchange of the control information can be provided.

According to embodiments of the invention, a toolstack of the virtualization platform may inform the back-end virtual machine that is in control of a physical back-end device about a new front-end virtual machine having a virtual device being created. The toolstack may receive new control information on how the new front-end virtual machine can access the back-end virtual machine's back-end driver that controls the physical back-end device. The toolstack may write the new control information into the predetermined memory area inside the new front-end virtual machine before the new front-end virtual machine starts its booting process. Further, the new front-end virtual machine's operating system may access the new control information to create a direct communication channel with the back-end virtual machine, wherein further communication including finishing initialization of the front-end virtual machine is done via the direct communication channel. Thus, a single point of failure is removed, and highly-scalable performance is provided by removing the bottleneck of centralized solutions having a centralized information store.

An embodiment of the present invention may provide a modification of a virtualization platform's toolstack such that it is able to embed control information—commonly placed in a back-end store or central information store—directly in a virtual machine, and more specifically in a special, read-only memory page. Furthermore, it may be provided that back-ends (e.g. for storage, networking, etc.) are modified to no longer rely on a back-end store or central information store.

FIG. 1 shows a Xen architecture including toolstack, the XenStore, software switch and split virtual drivers between the driver domain (dom0) and the guest domains. The term "domain" is primarily used when using the Xen hypervisor and is synonymous with the term "virtual machine".

FIG. 1 shows several building blocks which may be described as follows:

Building blocks "Dom0" (reference sign 1) and respectively "DomU 1" (reference sign 2) represents a domain, which is a virtual machine in the context of the Xen terminology.

In particular "Dom0" is the control domain in context of the Xen terminology, from the fact that the first started domain (having number 0) is awarded special privileges, such as being allowed to instruct the hypervisor to start and stop additional virtual machines. Hence, Dom0 is the administrative domain of Xen.

In particular "DomU" is an unprivileged domain in context of the Xen terminology, i.e. every domain other than "Dom0".

Building block "Xen Hypervisor" (reference sign 3) represents a system running on a physical machine and which is in charge of, e.g., creating, destroying, scheduling virtual machines. To put it more simply, the Xen Hypervisor is an operating system for operating systems. The Xen Hypervisor may also be designated as virtual machine monitor.

Building block "xl" (reference sign 4) represents a command-line tool that a system administrator can use to run commands such as "create a domain", "destroy a domain", etc.

Building block "libxl" (reference sign 5) represents a library that the xl command-line tool interacts with, and which in turn interacts with libraries libxc and libxs to facilitate xen-related tasks such as domain creation or destruction.

Building block "libxc" (reference sign 6) represents a Xen control library. Specifically, libxc is a library that includes, among other things, the code to interact with the hypervisor, by providing an interface to the various hypercalls required to control the system, in particular with regard to domain created, destruction, etc. A hypercall is a request from a domain to the hypervisor, for information, or for running a certain action on the domain's behalf. Conceptually similar to a system call, in which an application asks the operating system to, e.g., write data to a hard disk: since—in the context of the Xen architecture—the application must not access the hard disk itself for reasons of security and abstraction, it asks the operating to do so on its behalf. Some operations, such as creating or destroying domains, must not be done by a domain itself; it needs to ask the hypervisor to do so on its behalf (and only dom0 may typically ask for domain creation, for example; such requests by other domains would be rejected).

Building block "libxs" (reference sign 7) represents a XenStore library, in particular a library that provides an application programming interface (API) to interact with the XenStore.

Building block "SW switch" (reference sign 8) represents a software switch, which is a software implementation realizing network switching between its different ports. The physical network interface card NIC is connected to the virtual network devices via the software switch to allow control over the data flow between physical and virtual devices and for example also between different virtual devices of virtual machines.

Building block "XenStore" (reference sign 9) represents an implementation of an information storage. While the XenStore is primarily an information store, the fact that entities such as a netback driver can register watches to be informed of new information being put into the XenStore means that the XenStore, in a way, can also trigger events happening. So in the case of the XenStore, the netback registers a watch on the part that deals with network devices, so that whenever the toolstack wants to create a new virtual network device, it can simply write the information (e.g., which MAC address the device should have) into the XenStore, and the watch will trigger an event that tells the netback driver of this, which can then create a new virtual network device.

Building block "NIC" (reference sign 10) represents a network interface card (NIC), which is a network adapter used for network communication. The NIC driver is the driver in charge of controlling the NIC.

Building block "block" (reference sign 11) represents a block device, which is a term for a device that allows reading and writing to it. A typical example can be a hard disk, on which blocks of data are written and read from.

Building blocks "netback" (reference sign 12) and "netfront" (reference sign 13) represent split virtual drivers. A virtual driver may consist of two split virtual drivers, which can be designated as netback driver and netfront driver, respectively. The netback driver is the back-end of the driver for virtual network devices. This portion of the driver exports a unified network-device interface that can be accessed by any operating system, e.g. Linux (reference sign 14), that implements a compatible front-end. For example, when spawning a virtual machine that needs network access, a virtual network device is created. The virtual machine in charge of the physical network interface card (NIC) uses the back-end to create such a virtual network device. In this regard, it is noted that the virtual machine in charge of the physical network interface is generally the privileged control virtual machine, though this does not necessarily have to be the case. The virtual machine that is being created then uses the netfront driver to interact with that virtual device, much like a normal NIC driver would do with a physical NIC. This way, the data from the newly created virtual machine flows via its netfront driver to the control domain's netback, and from there via the NIC driver out of the physical machine. Similar driver concepts exist for block devices, where a blockfront and blockback model can be created to create a virtual hard disk.

Figure 2:
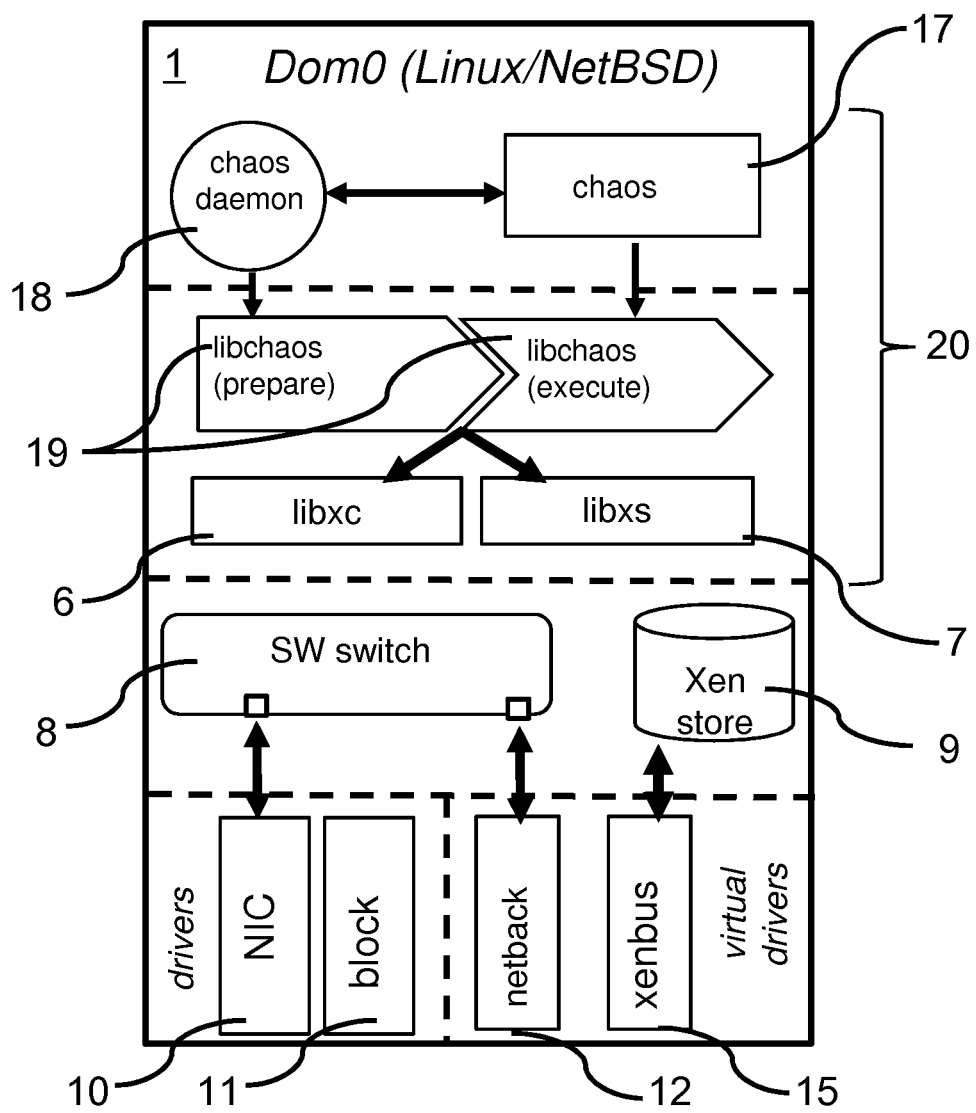
FIG. 2 is a schematic view illustrating an architecture overview for a method or a system providing an improved and adapted implementation of Xen's standard toolstack.
Figure 3:
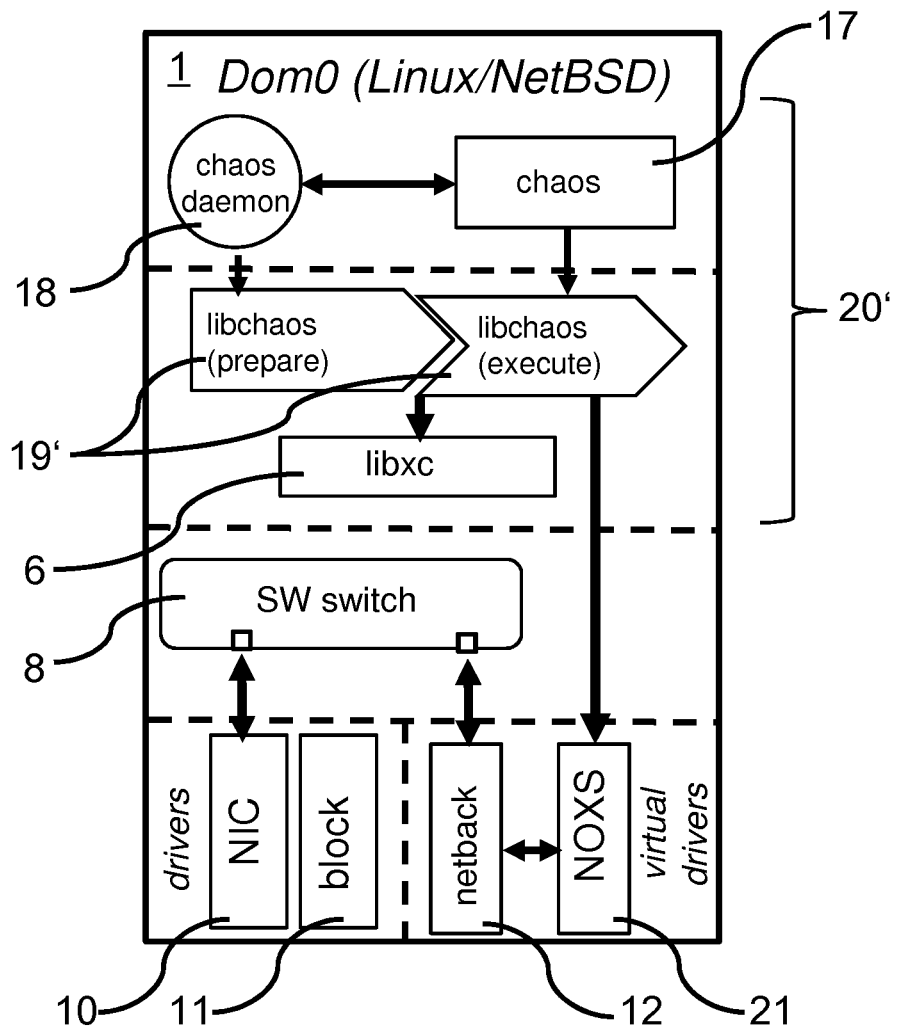
FIG. 3 is a schematic view illustrating an architecture overview for a method or a virtualization platform according to an embodiment of the present invention.

Building block "xenbus" (reference sign 15) represents a driver that provides an interface between the XenStore and the drivers for virtual devices, e.g. netback and netfront, which are illustrated in the FIG. 1, FIG. 2 and FIG. 3 as examples. Thus, the information from the drivers such as how to access the virtual network device can be stored in the XenStore and be read from there.

Building block "toolstack" (reference sign 16) represents a collection of tools and/or libraries, which provide interfaces between the hypervisor and the user/administrator of the system to interact and control the hypervisor. Thus, the toolstack may be a number of tools and libraries that are built on top of each other to provide certain functionalities. The toolstack being a collection of tools and libraries may be employed and/or may be configured to handle virtual machine management requests such as requesting, by the toolstack, a builder entity to create a new guest virtual machine in response to a user request. In the context of the embodiment illustrated by FIG. 1 the toolstack relates to the part of the control flow required to, e.g., create and/or destroy domains, which resides within the user space of the control domain.

In the context of the Xen architecture, e.g. as illustrated in FIG. 1, the toolstack is a component of Dom0, which is responsible for creating, destroying, and managing the resources and privileges of virtual machines. To create a new virtual machine a user provides a configuration file describing memory and CPU allocations as well as device configurations. Then the toolstack parses this file and writes this information in the XenStore. The toolstack takes advantage of Dom0 privileges to map guest memory, to load a kernel and virtual BIOS, and to set up initial communications channels with the XenStore and with the virtual console when a new virtual machine is created.

In the example of FIG. 1, the toolstack includes building blocks xl, libxl, libxc and libxs.

The Xen hypervisor as illustrated by FIG. 1 is a type-1 hypervisor in charge of managing basic resources such as CPUs and memory. When it finishes booting, it automatically creates a special virtual machine called dom0. Dom0 typically runs Linux and hosts the toolstack, which includes the xl command and the libxl and libxc libraries needed to carry out commands such as virtual machine creation, migration and shutdown.

In addition, dom0 hosts the XenStore, a proc-like central registry that keeps track of management information such as which virtual machines are running in the system and device information, along with the libxs library containing code to interact with it. The XenStore provides watches that can be associated with particular directories of the store and that will trigger callbacks whenever those directories are read or written to.

Typically, dom0 also hosts a software switch (Open vSwitch is the default) to mux/demux packets between NICs and the VMs, as well as the (Linux) drivers for the physical devices. Strictly speaking, this functionality can be put in a separate virtual machine. For communication between dom0 and the other guests, Xen implements a split-driver model: a virtual back-end driver running in dom0 (e.g., the netback driver in the case of networking) communicates over shared memory with a front-end driver running in the guests (the netfront driver). So-called event channels, essentially software interrupts, are used to notify drivers about the availability of data.

FIG. 2 shows an architecture overview for a method or a system that provides an improved and adapted implementation of Xen's standard toolstack.

Some of the building blocks illustrated in FIG. 2 correspond to the building blocks of FIG. 1. However, according to the embodiment of FIG. 2, the toolstack is modified compared to the standard platform architecture of FIG. 1. In particular the embodiment of FIG. 2 shows other building blocks as follows:

Building block "chaos" (reference sign 17) represents a command-line tool that replaces the building block xl of FIG. 1. Building block chaos provides the same functionality as xl, however, chaos is just more efficient with regards to, e.g., domain creation time (i.e., its use results in smaller times).

Building block "chaos daemon" (reference sign 18) represents a daemon—i.e. a program running in the background—whose job it is to run the prepare phase and thus prepare a number of virtual machine shells as well as keeping them ready to be used to create new domains by running the execute phase on them.

Building block "libchaos" (reference sign 19) represents a library, which in the case of the split toolstack the command line tool chaos and the chaos daemon interact with, and which in turn interacts with libxc and libxs in order to facilitate xen-related tasks such as domain creation or destruction.

Thus, in the embodiment of FIG. 2 the toolstack includes building blocks chaos daemon, chaos, libchaos, libxc and libxs for providing the concept of a split toolstack (reference sign 20).

The embodiment of FIG. 2 considers and improves shortcomings of conventional virtual machine platforms where a significant portion of the overheads related to virtual machine creation and other operations comes from the toolstack itself. More specifically, it turns out that a significant portion of the code that executes when e.g. a virtual machine creation command is issued does not actually need to run at virtual machine creation time. This is because this code is common to all virtual machines, and so can be pre-executed and thus off-loaded from the creation process in accordance with the implementation of the embodiment illustrated by FIG. 2.

Hence, according to the embodiment of FIG. 2, the standard Xen toolstack is replaced with the libchaos library and is split into two phases, namely into a prepare phase and a execute phase. The prepare phase is responsible for functionality common to all virtual machines such as having the hypervisor generate an ID and other management information and allocation CPU resources to the virtual machine. This functionality is offloaded to the chaos daemon, which generates a number of virtual machine shells and places them in a pool. The daemon may ensure that there are always a certain number of configurable virtual machine shells available in the system.

The execute phase then begins when a virtual machine creation command is issued. First, chaos contacts the daemon and asks for one of these virtual machine shells to be removed from the pool. It then completes this shell with virtual machine specific operations such as parsing its configuration file, building initialization its devices and booting the virtual machine.

The term "virtual machine shell" may refer to an empty virtual machine or rather to a partially initialized virtual machine for which all basic and generic steps have been done, and which only needs to be filled with an image and some device-specific configuration, e.g. MAC addresses for network devices, to create a fully functional virtual machine. The virtual machine shell can be pre-created before a virtual machine has to be started. Then, the virtual machine shell can be used when a virtual machine creation command is received, to speed up the creation process by only having to execute the execute phase of the toolstack. Hence, the virtual machine shell is a pre-created virtual machine that can be filled with content. The virtual machine shell is a partially-created virtual machine that waits to be filled with execution logic—that is at a minimum an operating system—in order to form a fully functional virtual machine.

The embodiment of FIG. 2 provides a process for virtual machine creation. As already described with regard to the architecture of FIG. 1, one of the key elements of a virtualization platform such as Xen, KVM, VMWare, etc., is the toolstack, which may include a command line tool (e.g., "xl" in Xen or "qemu-kvm" in KVM) and a set of libraries in charge of executing operations such as creating virtual machines, destroying them, migrating them, and accessing their console, etc.

The embodiment illustrated by FIG. 2 optimizes virtual machine creation times by means of splitting the toolstack's functionality into a set of functional processes each containing a number of code functions fn1 . . . fnN, and further classifying those into:

(1) a prepare phase that may be executed periodically and offline, and
(2) an execute phase that is executed when the command to create a virtual machine is received.

The prepare phase of the embodiment illustrated by FIG. 2 includes five functional processes that are common to virtual machines:

(1) Process of hypervisor reservation: Hypervisor reservation includes such jobs as creating the internal control structures, allocating information such as a unique ID to the virtual machine to be started, and filling that information into those control structures.
(2) Process of compute allocation: Compute allocation includes e.g. creating virtual CPUs and allocating them to the virtual machine.
(3) Process of memory reservation: Memory reservation includes e.g. setting aside memory for the virtual machine in which it can then run.
(4) Process of memory preparation: Memory preparation includes e.g. setting up the page table to allow paged memory access and scrubbing memory if needed (if memory has been used by other virtual machines before, to prevent information leakage between virtual machines).
(5) Process of device pre-creation: Device pre-creation includes e.g. creating a console and a virtual network card for eventual interfacing with real network hardware. This creates the virtual machine shell which is a partially initialized virtual machine for which all basic and generic steps have been done, and which only need to be filled with an image and some device-specific configuration (e.g., MAC addresses for network devices) to create a fully functional virtual machine.

The virtual machine shells generated by the process of device pre-creation can be pre-created before a virtual machine has to be started, and are then used when a virtual machine creation request is received, to speed up the virtual machine creation process by only having to execute the execute phase.

The execute phase of the embodiment illustrated by FIG. 2 includes the functional processes as follows:

(6) Process of configuration parsing: Configuration parsing includes e.g. that the configuration file describing the virtual machine (e.g., image, required memory, required device and their configuration parameters) is parsed.
(7) Process of device initialization: Device initialization includes e.g. that the devices are initialized according to the information acquired in the process of configuration parsing.
(8) Process of image build: Image build includes e.g. that the image, which contains the operating system and potentially a virtualized disk containing further tools, is opened, that its format is parsed, and that its data is loaded into the virtual machine memory according to the image's specification.
(9) Process of virtual machine boot: Virtual machine boot includes e.g. that the virtual machine finishes its creation, and starts its boot process. At this point, the control is handed over to the virtual machine and the toolstack's creation step is terminated.

According to the embodiment of FIG. 2, the pre-created/prepared virtual machine shells are kept track of, so that at any point, it is clear which virtual machine shells have been pre-created/prepared and which can thus be used for creating a virtual machine in them. This information can be kept in numerous ways, from a dedicated, fixed location in the hypervisor's memory over a file on the management domains file system.

According to the embodiment of FIG. 2, the use of a pre-create daemon is provided. The daemon is a background server process running inside the management domain, with which the toolstack can interact.

The daemon will aim to pre-create a number of virtual machine shells defined by the operator, keeping them available for future use. Whenever a virtual machine is to be created, the toolstack requests such a virtual machine shell from the daemon to fill it with the operating system and start the virtual machine. When the daemon runs low on virtual machine shells, it will aim to fill up its virtual machine shell backlog by pre-creating/preparing new virtual machine shells without impeding the performance and behavior of the already running virtual machines, e.g., by pre-creating virtual machine shells during times of low system load.

FIG. 3 shows an architecture overview for a method or a virtualization platform according to an embodiment of the present invention.

Some of the building blocks illustrated in FIG. 3 correspond to the building blocks of FIG. 1 and FIG. 2. However, according to the embodiment of FIG. 1, the toolstack is modified compared to the standard platform architecture of FIG. 1. In particular, the embodiment of FIG. 3 shows other building blocks as follows:

Building block "chaos" (reference sign 17) represents a command-line tool that replaces the building block xl of FIG. 1. Building block chaos provides the same functionality as xl, however, chaos is just more efficient with regards to, e.g., domain creation time (i.e., its use results in smaller times).

Building block "chaos daemon" (reference sign 18) represents a daemon—i.e. a program running in the background—whose job it is to run the prepare phase and thus prepare a number of virtual machine shells as well as keeping them ready to be used to create new domains by running the execute phase on them.

Building block "libchaos" (reference sign 19') represents a library, which in the case of the split toolstack the command line tool chaos and the chaos daemon interact with, and which in turn interacts with libxc and NOXS (reference sign 21) in order to facilitate tasks such as domain creation or destruction.

Thus, in the embodiment of FIG. 3 the toolstack includes building blocks chaos daemon, chaos, libchaos and libxc for providing the concept of a split toolstack (reference sign 20').

Building block "NOXS" (reference sign 21) represents a lean driver for replacing the XenStore (reference sign 9).

While the XenStore is primarily an information store, the fact that entities such as the netback driver can register watches to be informed of new information being put into the XenStore means that the XenStore, in a way, can also trigger events happening. So in the case of the XenStore, the netback registers a watch on the part that deals with network devices, so that whenever the toolstack wants to create a new virtual network device, it can simply write the information (e.g., which MAC address the device should have) into the XenStore. The watch will trigger an event that tells the netback driver of this, which can then create a new virtual network device. With store-less operation, as provided by the embodiment of FIG. 3, this functionality naturally goes away, so that a way for the toolstack to directly interact with drivers such as the netback driver is needed. The driver NOXS as illustrated in FIG. 3 is simply an interface that allows the toolstack to interact with the different virtual drivers in a convenient way whenever it, for example, wants to create a new virtual network device.

Figure 4:
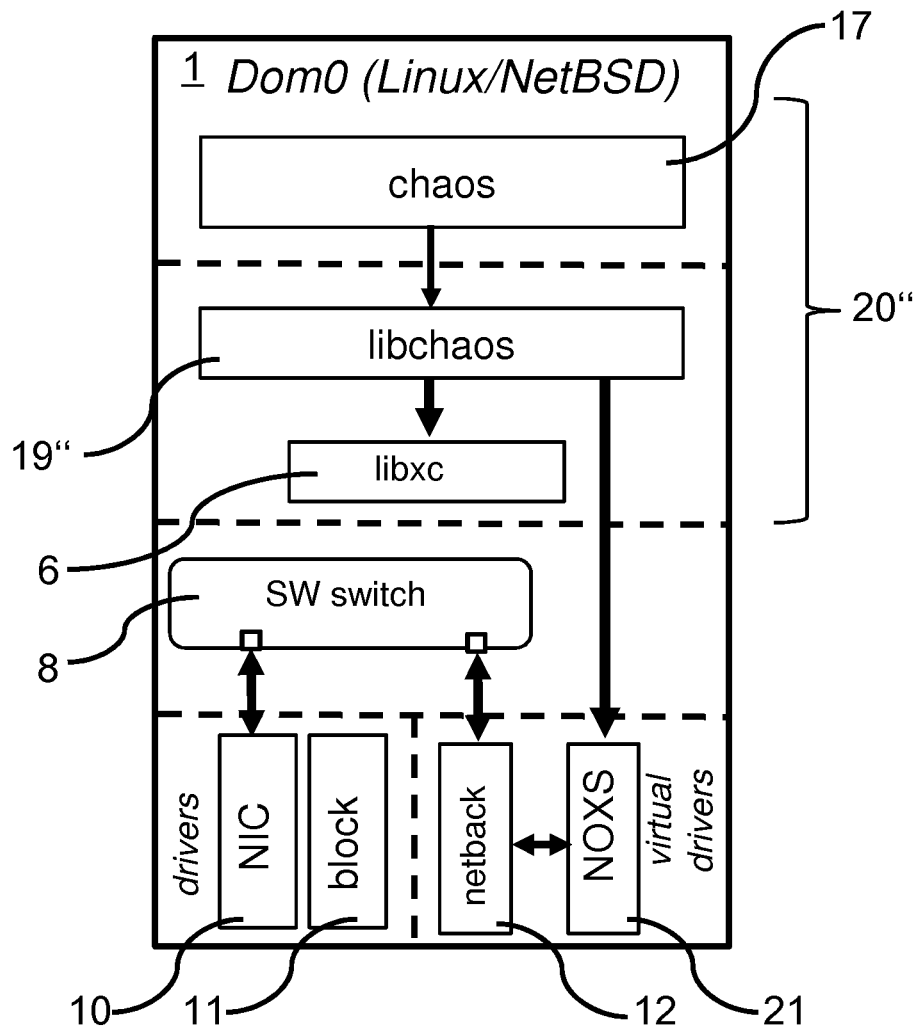
FIG. 4 is a schematic view illustrating an architecture overview for a method or a virtualization platform according to an embodiment of the present invention.

FIG. 4 shows an architecture overview for a method or a virtualization platform according to a further embodiment of the present invention.

Some of the building blocks illustrated in FIG. 4 correspond to the building blocks of FIG. 1, FIG. 2 and FIG. 3. However, according to the embodiment of FIG. 1, the toolstack is modified compared to the standard platform architecture of FIG. 1. In particular, the embodiment of FIG. 4 shows other building blocks as follows:

Building block "chaos" (reference sign 17) represents a command-line tool that replaces the building block xl of FIG. 1. Building block chaos provides the same functionality as xl, however, chaos is just more efficient with regards to, e.g., domain creation time (i.e., its use results in smaller times).

Building block "libchaos" (reference sign 19") represents a library, which interacts with the command line tool chaos, and which in turn interacts with libxc and NOXS (reference sign 21) in order to facilitate tasks such as domain creation or destruction.

In the embodiment of FIG. 3, the toolstack includes building blocks chaos daemon, chaos, libchaos and libxc for providing the concept of a split toolstack (reference sign 20").

Building block "NOXS" (reference sign 21) corresponds to the NOXS driver of the embodiment of FIG. 3.

Thus, according to the embodiment of FIG. 4, libxl and the corresponding xl command is replaced with a streamlined, thin library and command called libchaos and chaos, respectively; these no longer make use of the XenStore and its accompanying libxs library. Further, the toolstack keeps track of which back-ends are available (e.g., network, block) and is responsible for assigning any information needed for communication between them and the guests (e.g., event channels and grant references).

Figure 5A:
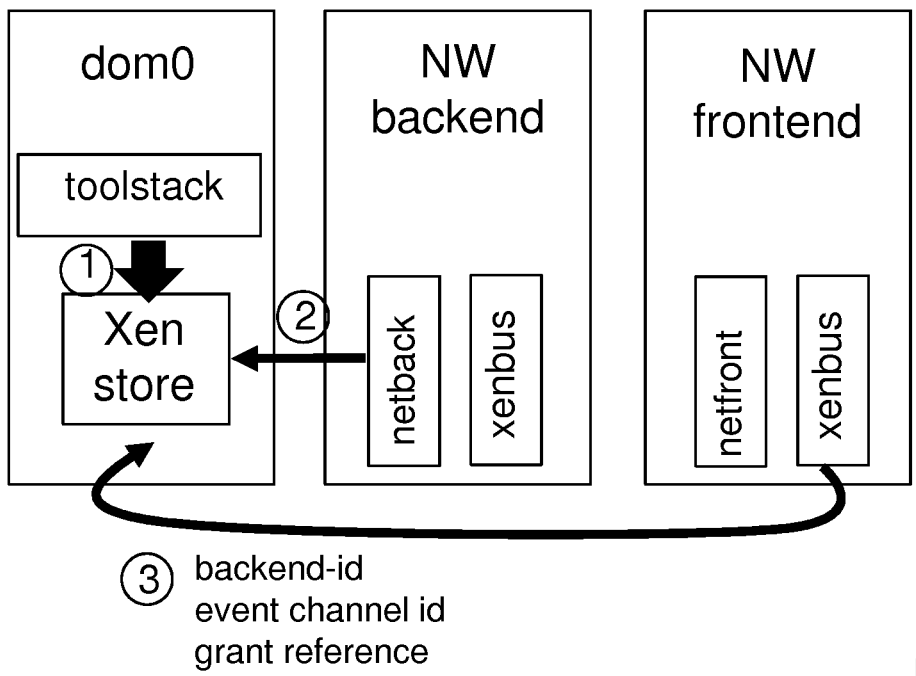
FIG. 5a is a schematic view illustrating a standard virtual machine creation process in Xen using the XenStore.
Figure 5B:
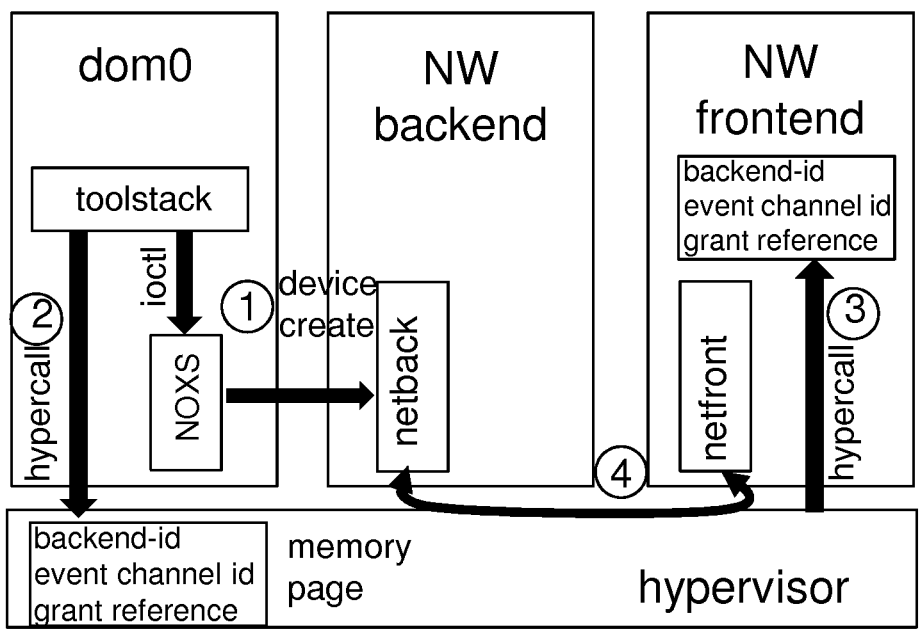
FIG. 5b is a schematic view illustrating a virtual machine creation process using a method or a virtualization platform according to an embodiment of the present invention.

FIG. 5a and FIG. 5b shows a standard virtual machine creation process in Xen using the XenStore in FIG. 5a versus a virtual machine creation process using a method or a virtualization platform according to an embodiment of the present invention in FIG. 5b.

Having identified the major bottlenecks in the standard system of Xen as illustrated by FIG. 5a, an implementation according to the embodiment of FIG. 5b introduces a re-design of some of the basic Xen mechanisms in order to provide lightweight virtualization over that virtualization platform.

There is a main obstacle to implementing lightweight virtualization on Xen, namely the XenStore, since many operations require multiple interactions with it, a problem that worsens with an increasing number of virtual machines.

To address this, according to the embodiment illustrated by FIG. 5b significant portions of the Xen ecosystem is redesigned. The XenStore is removed. Specifically, the XenStore is replaced with a lean driver called noxs and, additionally, a split toolstack that separates functionality between a prepare phase and an execute phase may be provided. Furthermore, a much leaner chaos command-line tool and libchaos library than the standard xl/libxl are used.

The XenStore is crucial to the way Xen functions, with many xl commands making heavy use of it. As way of illustration, FIG. 5a shows the process when creating a virtual machine and its (virtual) network device. First, the toolstack writes an entry to the network back-end's directory, essentially announcing the existence of a new virtual machine in need of a network device (step 1 in FIG. 5). Previous to that, the back-end placed a watch on that directory; the toolstack writing to this directory triggers the back-end to assign an event channel and other information (e.g., grant references, a mechanism for sharing memory between guests) and to write it back to the XenStore (step 2 in FIG. 5a). Finally, when the virtual machine boots up, it contacts the XenStore to retrieve the information previously written by the network back-end (step 3 in FIG. 5a).

The above is a simplification: in actuality, the virtual machine creation process alone can require interaction with over 30 XenStore entries, a problem that is exacerbated with increasing number of virtual machines and devices. Worse, the XenStore represents a single point of failure.

As it turns out, most of the necessary information about a virtual machine is already kept by the hypervisor (e.g., the virtual machine's id, but not the name, which is kept in the XenStore but is functionally not strictly needed). An insight of the present inventors is that the hypervisor already acts as a sort of centralized store, so its functionality is extended to implement the noxs (no XenStore) mechanism. Thus, according to the embodiment of FIG. 5b, it is possible to forego the use of the XenStore for operations such as creation, pause/unpause and migration.

Specifically, libxl and the corresponding xl command is replaced with a streamlined, thin library and command called libchaos and chaos, respectively (cf. FIG. 3 and FIG. 4); these no longer make use of the XenStore and its accompanying libxs library. Further, the toolstack keeps track of which back-ends are available (e.g., network, block) and is responsible for assigning any information needed for communication between them and the guests (e.g., event channels and grant references).

In addition, Xen's hypervisor is modified to create a new, special device memory page for each new virtual machine that is used to keep track of a virtual machine's information about any devices, such as block and networking, which it may have.

Furthermore, a hypercall is included to write to and read from this memory page, and make sure that the page is shared read-only with guests (but read/write with dom0).

When a chaos create command is issued, the tool-stack first requests the creation of devices from the back-end(s) through a system call (an ioctl) handled by the NOXS Linux kernel module (step 1 in FIG. 5b). This mechanism may work if the back-ends run in dom0. Furthermore, this mechanism may also work if back-ends run on a different virtual machine. The back-end then returns the details about the communication channel for the front-end. Second, the toolstack calls the new hypercall asking the hypervisor to add these details to the device page (step 2 in FIG. 5b).

When the virtual machine boots, instead of contacting the XenStore, it will ask the hypervisor for the address of the device page and will map the page into its address space using hypercalls (step 3 in FIG. 5b); this requires modifications to the guest's operating system. The guest will then use the information in the page to initiate communication with the back-end(s) by mapping the grant and bind to the event channel (step 4 in FIG. 5b). At this stage, the front and back-ends setup the device by exchanging information such as its state and its MAC address (for networking); this information was previously kept in the XenStore and is now stored in a device control page pointed to by the grant reference. Finally, front and back-ends notify each other of events through the event channel, which replaces the use of XenStore watches.

To support migration without a XenStore a new pseudo-device to handle power-related operations can be created. This device can be implemented, following Xen's split driver model, with a back-end driver (power-back) and a front-end (powerfront) one. These two devices can share a device page through which communication happens.

With this in place, migration may begin by chaos opening a TCP connection to a migration daemon running on the remote host and by sending the guest's configuration so that the daemon pre-creates the domain and creates the devices. Next, to suspend the guest, chaos issues an ioctl to the back-end which will set a field in the shared page to denote that the shutdown reason is suspend. The front-end will receive the request to shutdown, upon which the guest will save its internal state and unbind noxs-related event channels and device pages. Once the guest is suspended it may be relied on libxc code to send the guest data to the remote host.

Figure 6A:
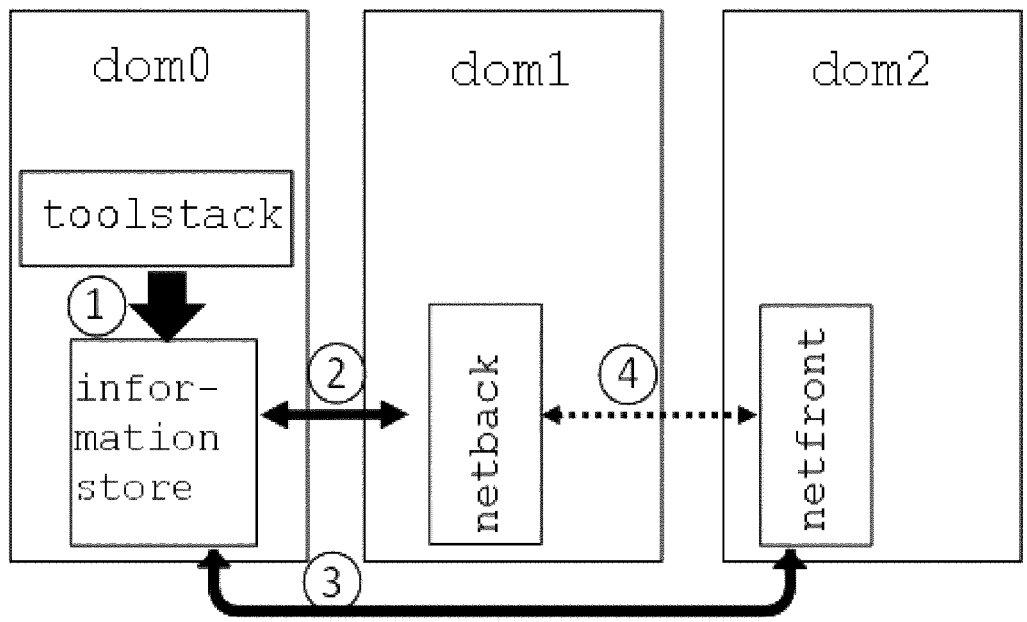
FIG. 6a is a schematic view illustrating a standard virtual machine creation process using a standard virtualization platform having a central information store.

FIG. 6a shows a standard virtual machine creation process using a standard virtualization platform having a central information store. The standard virtual machine boot process of FIG. 6a involves an information store during the creation of the virtual machine dom2.

Step (1): The toolstack writes information about the new front-end virtual machine dom2 into the information store.

Step (2): The back-end virtual machine dom1 that has control of the physical network device receives a notification and puts information about the network device into the information store.

Step (3): The new front-end virtual machine dom2 receives information from the information store to initialize its virtual network device, and puts its own initialization information in there.

Steps (2) and (3) iterate until the back-end virtual machine (dom1) and front-end virtual machine (dom2) have finished their initialization with each other.

Step (4): During initialization, a direct communication channel was set up that is now used for the data exchange during the virtual machine lifetime.

Figure 6B:
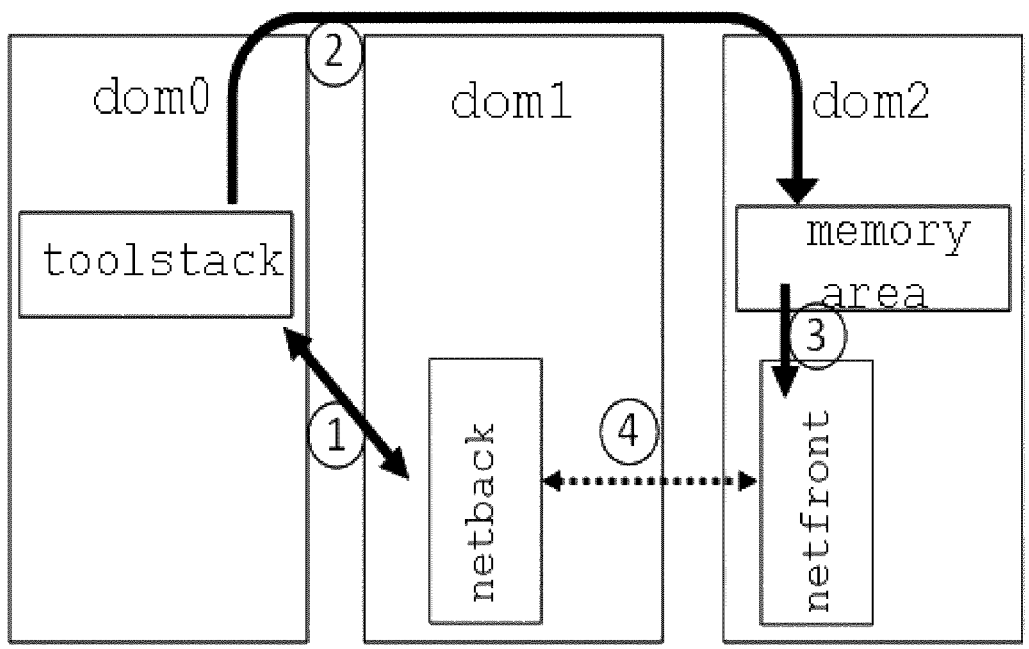
FIG. 6b is a schematic view illustrating a virtual machine creation process using a method or a virtualization platform according to an embodiment of the present invention.

FIG. 6b shows a virtual machine creation process using a method or a virtualization platform according to an embodiment of the present invention, wherein a central information store is removed.

Step (1): The toolstack informs the back-end virtual machine dom1 in control of the physical network device about a new front-end virtual machine dom2 with a virtual network device being created. The toolstack receives information on how the new front-end virtual machine dom2 can access the network driver of the back-end virtual machine dom1.

Step (2): The toolstack writes this information into a memory area inside/dedicated to the new front-end virtual machine dom2 before it starts the booting process.

Step (3): The front-end virtual machine's operating system accesses this information to create a direct communication channel with the back-end virtual machine dom1.

Step (4): All further communication including finishing the initialization is done via a direct communication channel.

Thus, the embodiment of FIG. 6b provides a method whereby a virtualization platform is able to function without a centralized information store such as the XenStore of Xen. This is implemented by embedding control information directly into the new or running front-end virtual machine dom2, in a memory area set aside for this task within the memory set aside for use by the front-end virtual machine dom2, as the front-end virtual machine is created (cf. FIG. 6b). The control information should include, at a minimum, information about the front-end virtual machine's devices (e.g., for network or storage I/O). To accomplish this, the toolstack is modified to embed the above-mentioned information into the front-end virtual machine's memory. Further, the front-end virtual machine operating system is modified such that when the front-end virtual machine starts, it no longer tries to contact a central information store: instead, the front-end virtual machine retrieves the control information from the predetermined memory area and uses that to directly contact any relevant communication back-end devices or rather its back-end drivers located at back-end virtual machines.

Thus, the information store is completely removed from the process, reducing virtual machine creation, destruction and migration times. As an extension, the process of embedding control information directly in the virtual machine page might be off-loaded from the local toolstack to an external entity such as an orchestrator framework (e.g., OpenStack). As a further extension, it would be possible for the toolstack to modify the special memory page by means of using a notification mechanism to let the virtual machine know that changes have been made and that the memory page, i.e. the memory area, needs re-reading; e.g., in case the physical devices change because of hot-plugging or migration of the virtual machine to a new physical machine, requiring re-initialization FIG. 7 shows a diagram illustrating the quantification of faster virtual machine creation, destruction and migration times of an embodiment according to the present invention compared to the standard virtual machine platform Xen having the XenStore as back-end store.

Figure 7:
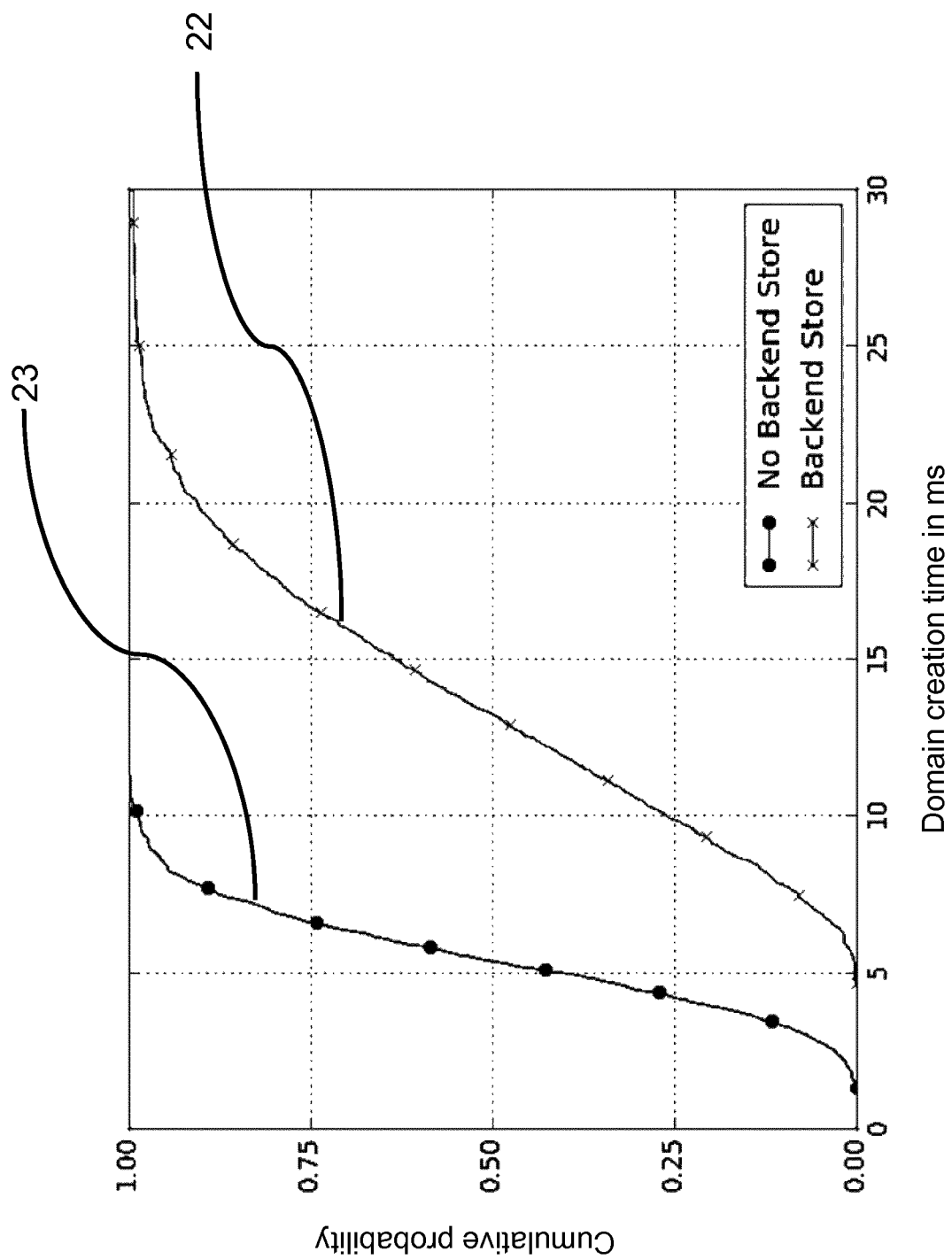
FIG. 7 is a diagram illustrating the quantification of faster virtual machine creation, destruction and migration times of an embodiment according to the present invention compared to the standard virtual machine platform Xen having the XenStore as back-end store.

The diagram of FIG. 7 plots a cumulative probability against a domain creation time in milliseconds.

To quantify faster virtual machine creation, destruction and migration times that are provided by an embodiment according to the present invention, Cumulative Distribution Function (CDF) is included when creating 1000 virtual machines as fast as possible on a single server using the Xen virtualization platform and a minimalistic virtual machine such as a unikemel. The standard platform (labeled "Back-end Store" in FIG. 4; reference sign 22) is compared against the method according to an embodiment of the present invention (labeled "No Back-end Store" in FIG. 4; reference sign 23). As illustrated by the diagram of FIG. 7, by using an embodiment according to the present invention practically all of the virtual machines boot in as little as 10 milliseconds; without it, the CDF shows a much longer tail (up to 300 milliseconds) and boot creation times that take at least three times as long as with a method according to an embodiment of the invention.

Many modifications and other embodiments of the invention set forth herein will come to mind to the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The following is a list of reference signs used herein:
1 Dom0
2 DomU 1
3 Xen Hypervisor
4 xl
5 libxl
6 libxc
7 libxs
8 SW switch
9 XenStore
10 NIC
11 block
12 netback
13 netfront
14 Operating system Linux
15 xenbus
16 toolstack
17 chaos
18 chaos daemon
19 libchaos
19' libchaos
19" libchaos
20 split toolstack
20' split toolstack
20" split toolstack
21 NOXS driver
22 Evaluation of Back-end Store
23 Evaluation of No Back-end Store

The invention claimed is:

1. A method for operating virtual machines on a virtualization platform, the method comprising:
embedding, in a predetermined memory area for a front-end virtual machine before the front-end virtual machine has been instantiated, control information that identifies a back-end virtual machine having at least one back-end driver for initializing at least one virtual device of the front-end virtual machine; and
wherein the control information embedded in the predetermined memory area of the front-end virtual machine causes the front-end virtual machine, upon instantiation, to directly contact the back-end virtual machine to establish a direct communication channel with the back-end virtual machine through which information for initializing the at least one virtual device is provided from the back-end driver to the front-end virtual machine,
wherein the control information includes an address of the back-end driver provided by the back-end virtual machine, and
wherein the front-end virtual machine instantiates when booted up for the first time and directly contacts the back-end virtual machine by transmitting a message directly to the address of the back-end driver, the message containing the address of the back-end driver.

2. The method according to claim 1, further comprising:
allocating, by a hypervisor of the virtualization platform, the predetermined memory area for the front end virtual machine;
after allocating the predetermined memory area, receiving a request to instantiate the front-end virtual machine; and
based on the received request, preparing and embedding the control information in the predetermined memory area.

3. The method according to claim 1, wherein a respective predetermined memory area dedicated to control information is reserved for each of a plurality of front-end virtual machines, each of the plurality of front-end virtual machines being instantiated upon a respective virtual machine creation command.

4. The method according to claim 1, wherein the predetermined memory area is set aside for the control information within a memory that is set aside for use by the front-end virtual machine, and
wherein the predetermined memory area is read-only from a perspective of the front-end virtual machine such that the front-end virtual machine lacks an ability to alter the control information.

5. The method according to claim 1, wherein the predetermined memory area is employed to keep track of the front-end virtual machine's control information about virtual devices that the front-end virtual machine has.

6. The method according to claim 1, further comprising:
tracking an availability of multiple back-end devices; and
selecting the back-end device from the multiple back-end devices based on the tracked availability of the back-end device;
based on the selecting, embedding the control information in the predetermined memory area.

7. The method according to claim 2, wherein the predetermined memory area for the front end virtual machine is allocated before any request to instantiate the front-end virtual machine is issued, and wherein a hypercall is employed by the hypervisor of the virtualization platform in order to write to and/or read from the predetermined memory area.

8. The method according to claim 1, wherein the predetermined memory area is configured to be shared read-only with unprivileged front-end virtual machines, and/or
wherein the predetermined memory area is configured to be shared writable with a privileged virtual machine.

9. The method according to claim 1, wherein a front-end driver for the at least one virtual device is configured to read the control information from the predetermined memory area and to initiate a direct communication session with the back-end driver of the back-end virtual machine based on the control information and without reference to information contained in any centralized database.

10. The method according to claim 1, wherein the front-end virtual machine is instantiated when the front-end virtual machine boots up for the first time, and wherein an operating system of the front-end virtual machine is configured to retrieve the control information from the predetermined memory area when the front-end virtual machine is instantiated.

11. The method according to claim 1, further comprising:
informing the back-end virtual machine that is in control of a physical back-end device controlled by the back-end driver about the front-end virtual machine being instantiated for a first time,
receiving, from the back-end virtual machine and in response to the informing, the control information providing how the front-end virtual machine can access a back-end driver of the back-end virtual machine that controls the physical back-end device,
writing the new control information into the predetermined memory area for the new front-end virtual machine before the new front-end virtual machine starts a booting process,
wherein an operating system of the new front end virtual machine accesses the new control information to create a direct communication channel with the back-end virtual machine, and
wherein further communication, including finishing initialization of the front-end virtual machine, is performed via the direct communication channel.

12. A virtualization platform comprising one or more processors configured to perform the method according to claim 1.

13. A tangible, non-transitory computer-readable medium having instructions thereon which, upon being executed by one or more processors, alone or in combination, provide for execution of the method according to claim 1.

14. A tangible, non-transitory computer-readable medium having instructions thereon which, upon being executed by one or more processors, alone or in combination, provide for execution of the method according to claim 2.

15. The method according to claim 1, wherein the control information is sufficient for the front-end virtual machine to directly contact the back-end virtual machine without the front-end virtual machine receiving additional information from a centralized store of information and without the front-end virtual machine contacting a centralized store of information.

16. The method according to claim 1, further comprising:
receiving a command to instantiate the front-end virtual machine;
based on the received command, querying the back-end virtual machine for the address of the back-end driver;
receiving the back-end driver address from the back-end virtual machine and embedding the control information in the predetermined memory area for the front-end virtual machine such that the control information includes the address of the back-end driver;
instantiating the front-end virtual machine, whereupon the control information causes the front-end virtual machine, upon instantiation, to directly contact the back-end driver of the back-end virtual machine.

17. The method according to claim 16, wherein the control information causes the front-end virtual machine to directly contact the back-end driver of the back-end virtual machine without the front-end machine contacting a central store of information; and
wherein the back-end driver of the back-end virtual machine is sufficient for the front-end virtual machine to instantiate the at least one virtual device.

18. The method according to claim 16, wherein the address is at least one of a media access control address and an internet protocol address.

19. A method for operating virtual machines on a virtualization platform, the method comprising:
allocating, by a hypervisor of the virtualization platform, a predetermined memory area for the front end virtual machine;
after allocating the predetermined memory area, receiving a request to instantiate the front-end virtual machine; and
embedding, based on the received request and in the predetermined memory area for a front-end virtual machine before the front-end virtual machine has been instantiated, control information that identifies a back-end virtual machine having at least one back-end driver for initializing at least one virtual device of the front-end virtual machine,
wherein the control information embedded in the predetermined memory area of the front-end virtual machine causes the front-end virtual machine, upon instantiation, to directly contact the back-end virtual machine to establish a direct communication channel with the back-end virtual machine through which information for initializing the at least one virtual device is provided from the back-end driver to the front-end virtual machine,
wherein the predetermined memory area for the front end virtual machine is allocated before any request to instantiate the front-end virtual machine is issued, and
wherein a hypercall is employed by the hypervisor of the virtualization platform in order to write to and/or read from the predetermined memory area.

20. A method for operating virtual machines on a virtualization platform, the method comprising:
embedding, in a predetermined memory area for a front-end virtual machine before the front-end virtual machine has been instantiated, control information that identifies a back-end virtual machine having at least one back-end driver for initializing at least one virtual device of the front-end virtual machine; and
wherein the control information embedded in the predetermined memory area of the front-end virtual machine causes the front-end virtual machine, upon instantiation, to directly contact the back-end virtual machine to establish a direct communication channel with the back-end virtual machine through which information for initializing the at least one virtual device is provided from the back-end driver to the front-end virtual machine, wherein the predetermined memory area is set aside for the control information within a memory that is set aside for use by the front-end virtual machine, wherein the predetermined memory area is read-only from a perspective of the front-end virtual machine such that the front-end virtual machine lacks an ability to alter the control information, wherein the predetermined memory area for the front end virtual machine is allocated before any request to instantiate the front-end virtual machine is issued, and wherein a hypercall is employed by a hypervisor of the virtualization platform in order to write to and/or read from the predetermined memory area.

21. A method for operating virtual machines on a virtualization platform, the method comprising:

allocating, by a hypervisor of the virtualization platform, a predetermined memory area for the front end virtual machine;

after allocating the predetermined memory area, receiving a request to instantiate the front-end virtual machine; and embedding, based on the received request and in the predetermined memory area for a front-end virtual machine before the front-end virtual machine has been instantiated, control information that identifies a back-end virtual machine having at least one back-end driver for initializing at least one virtual device of the front-end virtual machine, wherein the control information embedded in the predetermined memory area of the front-end virtual machine causes the front-end virtual machine, upon instantiation, to directly contact the back-end virtual machine to establish a direct communication channel with the back-end virtual machine through which information for initializing the at least one virtual device is provided from the back-end driver to the front-end virtual machine, and wherein the control information is sufficient for the front-end virtual machine to directly contact the back-end virtual machine without the front-end virtual machine receiving additional information from a centralized store of information and without the front-end virtual machine contacting a centralized store of information.

\* \* \* \* \*